United States Patent [19]

Klein et al.

[11] Patent Number: 6,042,884
[45] Date of Patent: Mar. 28, 2000

[54] AQUEOUS RUTHENIUM CHLORIDE SOLUTION FOR BLACKENING CERAMIC SURFACES

[75] Inventors: Thomas Klein, Heidelberg; Thomas Staffel, Gruenstadt; Lysander Fischer, Rauenberg, all of Germany

[73] Assignee: BK Giulini Chemie GmbH, Ludwigshafen, Germany

[21] Appl. No.: 09/011,898

[22] PCT Filed: Jun. 13, 1997

[86] PCT No.: PCT/EP97/03087

§ 371 Date: Apr. 30, 1998

§ 102(e) Date: Apr. 30, 1998

[87] PCT Pub. No.: WO97/49650

PCT Pub. Date: Dec. 31, 1997

[30] Foreign Application Priority Data

Jun. 24, 1996 [DE] Germany .............. 196 25 236

[51] Int. Cl.$^7$ ...................................... B05D 3/02
[52] U.S. Cl. .................. 427/226; 427/299; 427/336
[58] Field of Search ................. 427/226, 299, 427/336

[56] References Cited

U.S. PATENT DOCUMENTS 4,927,671  5/1990  Nawothnig .................... 427/274
5,032,452  7/1991  Nowitzki et al. ............... 427/287

FOREIGN PATENT DOCUMENTS

248541 B1  12/1986  Czech Rep. .
0 704411 A1  3/1996  European Pat. Off. .

OTHER PUBLICATIONS

Ullmann, F., *Enzyklopädie der technischen Chemie* [Encl. of Tech. Chem.], 2nd ed., vol. 4, 1929, pp. 837–838.

*Primary Examiner*—Shrive Beck
*Assistant Examiner*—Kirsten A. Crockford
*Attorney, Agent, or Firm*—Venable; George H. Spencer; Ashley J. Wells

[57] ABSTRACT

An aqueous ruthenium chloride solution for blackening ceramic surfaces includes ruthenium chloride; water present in an amount effective to provide an aqueous solution of ruthenium chloride; and a buffer which is selected from the group consisting of sodium acetate, sodium propionate, potassium acetate, potassium propionate, and mixtures thereof, and which is present in an amount effective to provide the aqueous solution with a pH of at least 1.5. A method for dyeing a ceramic surface includes applying the aqueous solution of ruthenium chloride to a ceramic surface by at least one of spraying, dipping, painting and printing to provide a treated surface; drying and firing the treated surface at a temperature ranging from about 300 to about 1400° C. for a period of time ranging from one half hour to five hours; and grinding and polishing the treated surface to even out the treated surface.

11 Claims, No Drawings

AQUEOUS RUTHENIUM CHLORIDE SOLUTION FOR BLACKENING CERAMIC SURFACES

BACKGROUND OF THE INVENTION

1. Field of the Invention

The present invention relates to mixtures for blackening ceramic products by using aqueous solutions of ruthenium compounds.

2. Description of the Related Art

It has been disclosed that ruthenium chloride can be used in an aqueous solution for dyeing porcelain gray-black. During this process, a strongly acid aqueous solution of the ruthenium chloride is applied to the ceramic body and is burnt in; during this process, the chloride decomposes and the ruthenium oxide is left in superfine form and combines with the silicic acid or alumina of the ceramic bodies while forming color pigments (see Ullmann, Enzyklopädie der technischen Chemie [Encyclopedia of Technological Chemistry], 2nd edition, volume 4, pages 837 and 838).

The Czech patent application CS 248 541 B1 discloses that ruthenium oxide in zirconium silicate crystal lattices results in a gray-black color, so that such compounds can be used as black pigments.

Furthermore, EP 0 704 411 A1 describes that ruthenium salt or ruthenium complexes with polycarboxylic acids result in a dark gray coloration (identified as "black") if the application takes place on the ceramic body by first pre-treating (activating) the ceramic body with water, then dying it with the ruthenium solution and subsequently aftertreating it with water. But this method also leads only to comparatively dark but not genuinely black colorations.

Therefore, the problem arose to find means with which ceramic surfaces can be dyed jet black in a simple and economical manner.

SUMMARY OF THE INVENTION

This object is solved by the features of the main claim and is advanced by the features of the dependent claims.

The solutions according to the invention are comprised of an aqueous solution of commercially available ruthenium chloride, which solutions normally comprise a certain excess of the mineral acid for stabilization. This aqueous solution is buffered with sodium or potassium acetate or propionate to a pH of >1.5, in particular >2, while stable solutions are also obtained over rather long time periods.

Here, the solution is set to a ruthenium concentration of 0.1–10 weight %; depending on the excess of mineral acid, correspondingly large amounts of, for example, sodium acetate are required for buffering; normally, concentrations which are also in the range from 0.1–10 weight % are used.

The solutions according to the invention are applied to the ceramic bodies to be dyed in the usual manner by spraying, dipping, painting, printing, etc., with amounts of 0.1–5 g/m$^2$ of surface being sufficient for the coloration.

After drying, the ceramic bodies are fired in a suitable kiln at a temperature between 1300 and 1400° C. For the decomposition of the ruthenium compounds, temperatures of 800–1200° C., in particular 1140° C., are preferred. The firing duration amounts to between one half hour and 5 hours, preferably between 1 and 2 hours. During this time, the ruthenium compounds are pyrolyzed and ruthenium dioxide is formed in finely distributed form. The color effect can be promoted in a known manner through suitable mineralizers such as alkali fluorides and alkali chlorides, fluorosilicates, etc. as well as through the addition of molybdenum compounds or tungsten compounds.

The color effect obtained after firing is determined objectively with the assistance of an La*b* system. In this system, "L" stands for the luminosity, while "a*" and "b*" indicate the tint as well as the color saturation. In this context, "a*" designates the position on a red-green axis, and "b*" the position on a yellow-blue axis.

Up until now it has not been possible to determine what the substantial color intensification of the buffered systems according to the invention is based on compared to unbuffered systems. Possible explanations might be that the particle shape and/or particle size of the deposited ruthenium oxides from the buffered solution is different than in the unbuffered solution. Another possibility might be that a certain roughening of the ceramic surfaces takes place during the evaporation of the unbuffered mineral acids during the pyrolysis, thus effecting an additional scattering of light and therewith a "gray tint". On the other hand, also the mineral acid appears to have an important influence, so that it is not only the pH of the solution that is decisive, because, for example, the ruthenium complexes with organic polycarboxylic acids such as polyacrylates or vinyl ether copolymers with maleic acid disclosed in the above-cited EP 0 704 411 also result in stable complexes at pH values of ≧2, but they only accomplish dark gray colorations during firing. It is therefore conceivable that sodium chloride is formed during the firing from sodium acetate and chloride, with the sodium chloride being responsible for producing the color as a mineralizer.

The aqueous solutions according to the invention penetrate the surface of the ceramic bodies to a depth of 0.5 to 2 mm; it is possible to additionally influence the penetration depth in a known manner through viscosity-regulating means such as glycerine, glucomannan, sugar or other means; during firing, the solutions then render a correspondingly deep thoroughly dyed top layer. The organic substance is burnt to form $CO_2$ and $H_2O$. Afterward, bruises and roughnesses of the surface can also be evened out in a known manner through grinding as long as the grinding does not take off more than the depth that corresponds to the penetration depth of the dye solutions. During the application, the solution itself runs relatively little, so that, in particular, also sharp-contoured printing, e.g., by way of the silk-screen process, is possible. With known dye solutions of other colorations, it is also possible to attain composite decorative designs in this manner.

DESCRIPTION OF THE PREFERRED EMBODIMENTS

The examples which follow describe the method according to the invention in greater detail without being intended to limit the same.

EXAMPLE 1

Ruthenium chloride solution is buffered with sodium acetate to pH 2 and set to 6 weight % Ru.

White ceramic tiles having an edge length of 5×5 cm are sprayed with this solution on their top side by means of an atomizer until the slab weight has increased by 0.2 g. The tiles are then dried in the drying oven at 100° C. and are subsequently transferred to the firing kiln where they are held for 6 hours at 600° C. before the temperature is raised to 1140° C. within one hour and held at this temperature for a further hour before the slabs are slowly cooled down again. The surfaces of the slabs are then ground smooth.

After the above-described firing process, the following color values are obtained on the tile surfaces:

|  | L* | a* | b* |
|---|---|---|---|
| V & B tile - test no. 1 | 38.26 | −2.42 | −2.64 |
| V & B tile - test no. 2 | 36.97 | −2.05 | −3.18 |
| V & B tile - blank test | 75.34 | 5.84 | 10.03 |

EXAMPLE 2

Ruthenium chloride solution is buffered with sodium acetate to pH 1.5 and set to 6 weight % Ru.

After the above-described application and firing process, the following color values are obtained on the tile surfaces:

|  | L* | a* | b* |
|---|---|---|---|
| V & B tile - test no. 3 | 31.64 | −1.26 | −4.37 |
| V & B tile - test no. 4 | 32.13 | −1.41 | −4.15 |
| V & B tile - test no. 5 | 31.31 | −1.01 | −4.64 |
| V & B tile - blank test | 75.34 | 5.84 | 10.03 |

What is claimed is:

1. An aqueous ruthenium chloride solution for blackening ceramic surfaces, comprising:

ruthenium chloride;

water present in an amount effective to provide an aqueous solution of ruthenium chloride; and a buffer which is selected from the group consisting of sodium acetate, sodium propionate, potassium acetate, potassium propionate, and mixtures thereof, and which is present in an amount effective to provide the aqueous solution with a pH of at least 1.5.

2. The aqueous ruthenium chloride solution according to claim 1, wherein the aqueous solution is buffered to a pH of above 2.0.

3. The aqueous ruthenium chloride solution according to claim 1, wherein the ruthenium chloride is present in an amount ranging from about 0.1 to about 10 weight %.

4. The aqueous ruthenium chloride solution according to claim 3, wherein the ruthenium chloride is present in an amount ranging from about 1 to about 5 weight %.

5. The aqueous ruthenium chloride solution according to claim 1, further comprising a thickener.

6. A method for dyeing a ceramic surface, comprising:

a. applying an aqueous solution of ruthenium chloride according to claim 1 to a ceramic surface by at least one of spraying, dipping, painting and printing to provide a treated surface;

b. drying and firing the treated surface at a temperature ranging from about 300 to about 1400° C. for a period of time ranging from one half hour to five hours; and c. grinding and polishing the treated surface to even out the treated surface.

7. The method according to claim 6, wherein the treated surface is dried and fired at a temperature ranging from about 800 to about 1200° C.

8. The method according to claim 6, wherein the treated surface is dried and fired at a temperature of 1140° C.

9. The method according to claim 6, wherein the period of time of drying and firing the treated surface ranges from 1 to 2 hours.

10. The method according to claim 6, wherein the surface of the ceramic body is sprayed and activated with water prior to the application of the solution.

11. The method according to claim 6, further comprising treating the treated ceramic surface with water prior to drying and firing so that the solution penetrates to an increased depth.

* * * * *